INVENTOR.
JOHN P. BURGARELLA
BY

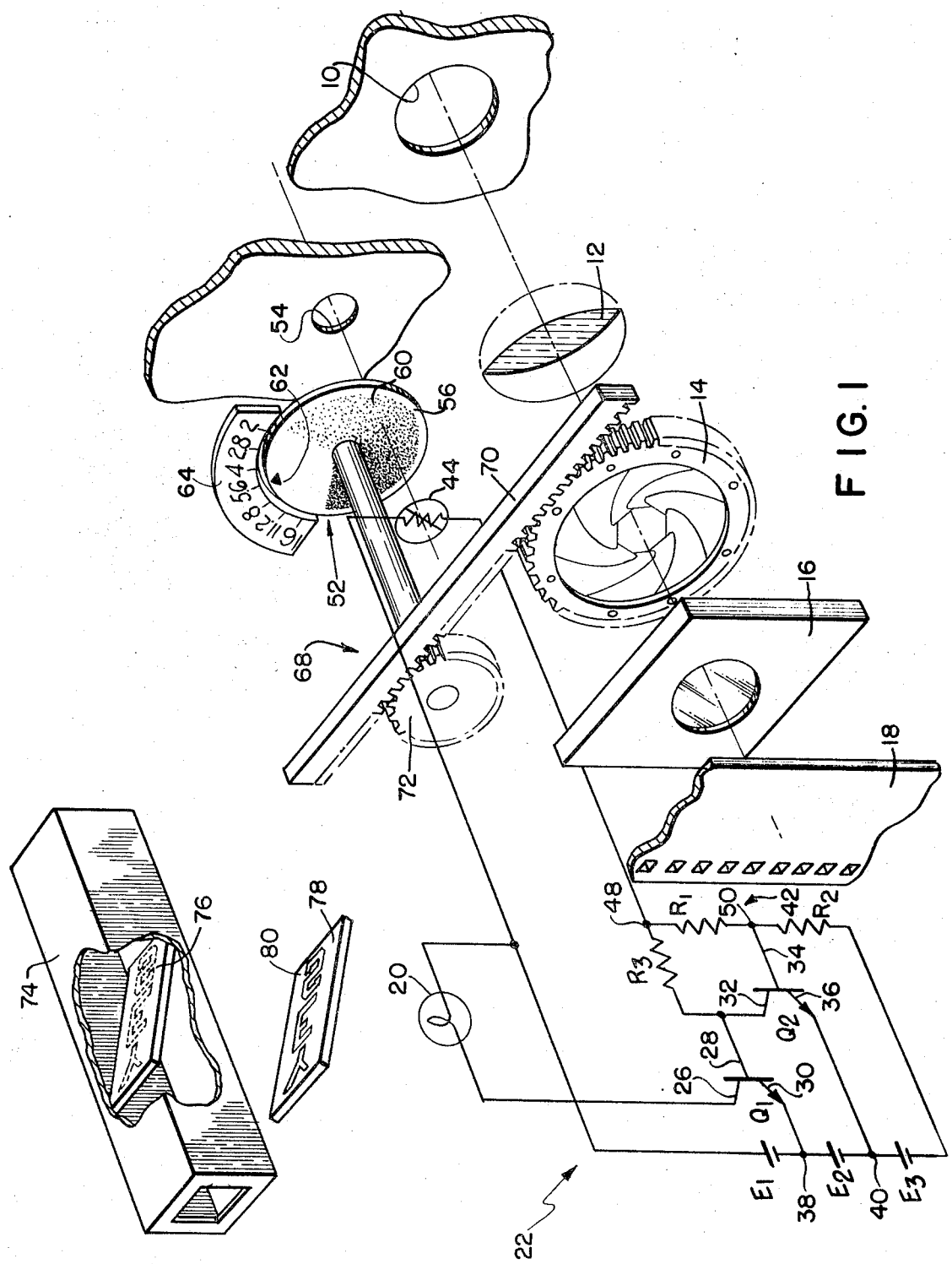

BROWN and MIKULKA
ATTORNEYS

United States Patent Office 3,545,870
Patented Dec. 8, 1970

3,545,870
PHOTOMETRIC APPARATUS INCORPORATING LIGHT RESPONSIVE TRANSISTORIZED SWITCHING CIRCUIT
John P. Burgarella, Sudbury, Mass., assignor to Polaroid Corporation, Cambridge, Mass., a corporation of Delaware
Filed Dec. 27, 1965, Ser. No. 516,240
Int. Cl. G01j 1/42, 1/44
U.S. Cl. 356—226                                13 Claims

ABSTRACT OF THE DISCLOSURE

Photometric apparatus for determining a photometric value corresponding to the brightness of a field of illumination. The apparatus utilizes a signal lamp which is coupled with a transistorized switching circuit. The switching circuit is actuated by a light sensitive voltage dividing network. Energization of the lamp by the circuitry indicates that a proper exposure factor value has been selected.

This invention relates to photometric apparatus for indicating the selection of a photometric value corresponding to the brightness of a measured field of illumination. More particularly, this invention concerns photometric apparatus useful for indicating when an appropriate photographic exposure factor value has been selected.

Many types of apparatus have been designed for measuring the brightness of a given light source or field of illumination. Each type has had certain qualities, but has also had certain other characteristics which impair its overall performance and usefulness. For example, photometric devices of the galvanometer type are accurate but are apt to be inconveniently delicate. In addition, they require that the operator divert attention from the field of illumination to the meter to take a brightness level reading.

In certain photographic applications, the photographer often must act quickly, as where the scene involves action. In these situations, the necessity of the photographer's having to divert his vision from the scene to the meter to take a reading and then having to make the necessary conversion of the reading into exposure settings on the camera can be quite bothersome.

It would be desirable, then, to provide photometric apparatus which would by a positive and emphatic signal indicate the selection of a unique photometric value corresponding to the brightness of the measured field of illumination. In photographic applications, the apparatus would signal the selection of an exposure factor value within a narrow range of values appropriate for the scene brightness and the photosensitive materials employed.

Certain prior art photometric devices include signaling arrangements wherein the signal means is activated above a signal condition, herein defined as the condition obtaining when an appropriate exposure factor value has been selected. In these devices the signal means is deactivated below the signal condition. With such prior art arrangements, the signal condition is actually a nonexistent state between the "signal on" and "signal off" states. Thus, the activation of the signal means indicates that the selected exposure factor value is either too great or too small, and, likewise, a deactivation of the signal means indicates the selection of an exposure factor value which is inappropriate in the opposite sense.

The signal provided should be positive or active rather than negative or passive since the absence of an indicating signal cannot be distinguished from an inoperative state of a measuring and indicating instrument, the former being more readily perceived by the operator. In addition, the utilization of a positive signal provides a "fail-safe" feature which enables the operator to ascertain with certitude that the indication given may be relied upon.

Accordingly, it is a primary object of this invention to provide photometric apparatus which yields a positive signal indicating the selection of a unique photometric value corresponding to the brightness of a measured field of illumination.

It is another object of this invention to provide photographic photometric apparatus which utilizes a signal means and a light-responsive, transistorized control circuit for the signal means to provide a positive signal indicating the selection of an exposure factor value appropriate for the scene brightness and the photosensitive materials employed.

It is a further object of this invention to provide photographic photometric apparatus which is simple to operate and which is rugged and relatively inexpensive to produce.

Briefly, one embodiment of the photometric apparatus constituting the subject invention comprises electrical signal means such as a lamp, semiconductor switching means for controlling the energization of the lamp, and a voltage-dividing network providing bias for the switching means, the network including a photoconductive element exposed to light from the scene to be photographed. The division of voltage on the voltage-dividing network is selectively variable, as by means of a graded density filter movably mounted in front of the photoconductive element to control the scene light admitted to the photoconductive element and, thus, the resistance of the element. With the circuit parameters properly selected and all components of the apparatus properly calibrated, only at selected exposure factor values within a narrow range of appropriate values is the switching means effective to cause a "fail-safe" energization of the lamp.

Other objects of this invention will in part by obvious and will in part appear hereinafter.

The invention accordingly comprises the apparatus possessing the construction, combination of elements and arrangement of parts which are exemplified in the following detailed disclosure, and the scope of the application of which is indicated in the claims.

For an understanding of the nature and objects of the invention, reference should be had to the following detailed description taken in connection with the accompanying drawings, wherein:

FIG. 1 is a schematic representation of one embodiment of the invention including a control circuit;

Figure 3:
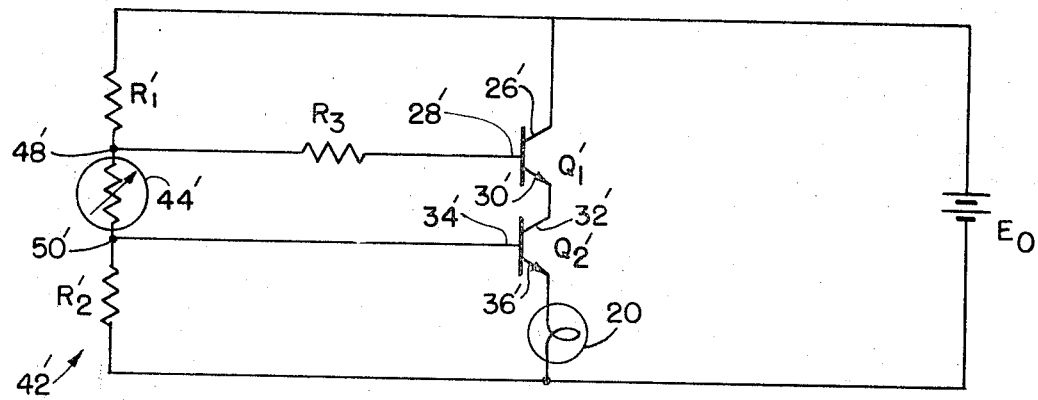
FIG. 3 illustrates an additional form of the control circuit.

In FIG. 1 of the drawings, one possible structural implementation of the inventive concept is diagrammatically illustrated. The novel photometric apparatus is shown in FIG. 1 as being adapted for use in a camera including an exposure aperture 10, an objective lens 12, a variable diaphragm 14, a shutter mechanism 16, and a sheet 18 of photosensitive material.

In order to provide a clearly perceptible signal at a signal condition wherein an appropriate exposure factor value for the scene brightness and the photosensitive materials employed has been selected, the subject apparatus includes a lamp 20. A control circuit 22 for controlling the activation of the lamp 20 includes semiconductor switching means 24 comprising an NPN transistor $Q_1$ having collector, base, and emitter electrodes 26, 28 and 30, respectively, and a second NPN transistor $Q_2$ having collector, base, and emitter electrodes 32, 34 and 36, respectively. The lamp 20 is connected in the collector circuit of transistor $Q_1$, the emitter electrode 30 of $Q_1$ being tapped at terminal 38 on a source of supply voltage for the circuit comprising the sum of sources $E_1$, $E_2$ and $E_3$. It is evident that when $Q_1$ is turned on, the lamp 20 will be activated by source $E_1$.

In order to assist in the precise definition of the signal condition, transistor $Q_2$ has its collector electrode 32 connected to the base electrode 28 of transistor $Q_1$ and has its emitter electrode 36 tapped at terminal 40 between voltage sources $E_2$ and $E_3$. Transistor $Q_2$ is thus connected in parallel with the base emitter circuit of transistor $Q_1$.

A voltage-dividing network 42 comprising a photoconductive element 44 and resistors $R_1$ and $R_2$ develops voltages at terminals 48 and 50 which control the conduction of transistors $Q_1$ and $Q_2$. Resistor $R_3$ is a bias resistor for providing a suitable base bias current for transistor $Q_1$.

In order that the division of a voltage on the voltage-dividing network 42, and hence the control voltages appearing at terminals 48 and 50 on the voltage-dividing network 42 may be selectively adjusted, a variable light-attenuating means 52 is provided. The light-attenuating means 52 is disposed between the photoconductive element 44 and an opening 54 through which light from the scene is admitted to the photoconductive element 44.

The light-attenuating means 52 comprises, in the embodiment illustrated, a disc 56 rotatably mounted on a shaft 58. The disc 56 incorporates a graded density filter 60. The disc 56 is manually rotatable and may have an index mark 62 thereon which is used in conjunction with appropriate indicia 64 to illustrate the selected exposure factor value. Each setting of the disc 56 corresponds to a level of scene brightness; hence, the indicia 64 might be used to represent a range of exposure values, shutter speeds, foot candles or any other scale, each value of which corresponds to a particular brightness of a measured field of illumination. In the illustrated embodiment, which assumes a fixed shutter speed and film speed, the indicia 64 is shown as indicating a range of $f$-numbers.

The novel photometric apparatus may be operated as a separate instrument, or, as illustrated in FIG. 1, the apparatus may be coupled directly to one or more elements of the exposure control apparatus in a camera. In order to effectuate such a coupling, coupling means 68 is provided. The coupling means 68 comprises a rack 70 and a pinion 72 on shaft 58 translating angular movement of the disc 56 into a setting of the variable diaphragm 14. With such a coupling arrangement to automatically set the variable diaphragm 14, the illustrated indicia 64 (a range of $f$-numbers) would be useful in determining the depth of field at a given level of scene brightness.

It is desirable that the illumination produced by the lamp 20 may be perceived by the operator without taking his eyes from the field of view. To this end, a viewfinder 74 may include a half-silvered mirror 76 properly inclined to reflect light from the lamp 20 into the operator's eye. A mask plate 78 having a window 80 in the shape of a clearly understandable symbol or word, such as the word "YES," is disposed between the lamp 20 and the mirror 76. Thus, when the lamp 20 is activated, the radiation produced thereby will pass through the window 80 and will be partially reflected into the eye of the operator by the half-silvered mirror 76, thus indicating that an appropriate exposure factor value has been selected.

The operation of the embodiment illustrated in FIG. 1 is as follows. The operator need merely view the scene to be photographed through the viewfinder 74 and begin to turn the disc 56. As the disc 56 is rotated in search of an appropriate relative aperture value, the amount of scene light admitted through the filter 60 to the photoconductive element 44 changes and the resistance of the element 44 varies. At a signal condition wherein the selected relative aperture value falls within a narrow range of values appropriate for the scene brightness and photosensitive materials used, the photoconductive element 44 has a predetermined resistance value. The division of the voltage applied across the voltage-dividing network 42 is such that a voltage is produced at terminal 48 which triggers transistor $Q_1$ into conduction, causing the lamp 20 to be activated. Thus, when an appropriate relative aperture value has been selected, the operator will be made aware of this fact by the sudden appearance of the word "YES" on the field of view.

By this invention, then, apparatus is provided which yields a positive signal only when an exposure factor value within a narrow range of appropriate values has been selected. The selection of an inappropriate exposure factor value on either side of the signal condition is indicated by the deactivation of the signal means employed. Thus, in FIG. 1, if a relative aperture value is selected which would cause an overexposure of the photosensitive materials, the filter 60 will be positioned to allow an excessive amount of scene light to impinge on photoconductive element 44, causing the resistance of the photoconductive element 44 to be less than the predetermined value. Assuming a proper selection of resistors $R_1$ and $R_2$, voltage will be produced at terminal 50 which is effective to bias transistor $Q_2$ into conduction.

With transistor $Q_2$ conducting, the bias across the base and emitter electrodes 28, 30 of transistor $Q_1$ will be reduced, causing transistor $Q_1$ to be turned off and the lamp 20 to be deactivated.

If a relative aperture value is selected which would cause the photosensitive materials to be underexposed, the disc 56 will be positioned such that the filter 60 blocks too much scene light from the photoconductive element 44. Thus, the resistance of element 44 will be greater than the predetermined resistance value and the division of voltage on the voltage-dividing network 42 will be such that the voltage on terminal 48 will fall below the trigger voltage and transistor $Q_1$ will be turned off.

Thus, it is evident that with this novel photometric apparatus, a positive signal is produced by the lamp 20 only when an exposure factor value within a narrow range of appropriate values has been selected. A deviation from this range of appropriate values in either direction will result in a deactivation of the lamp 20. The width of the range of appropriate values and the values of resistance of the element 44 at which the lamp is activated and deactivated can easily be controlled by a proper selection of resistors 81 and 82.

Figure 2:
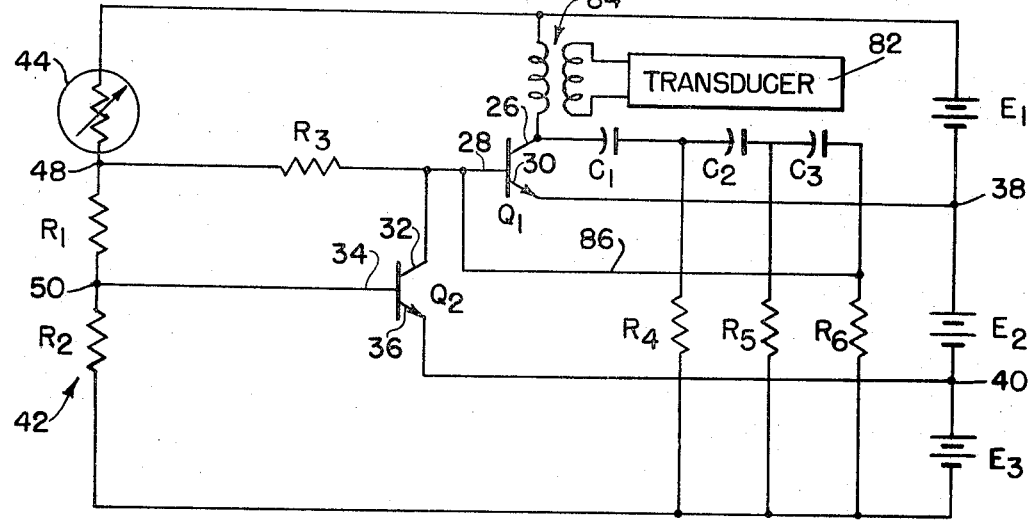
FIG. 2 illustrates an alternate control circuit useful in the practice of the invention.

FIG. 2 shows a modification of the control circuit 22 illustrated in FIG. 1. This modified circuit is structurally and functionally identical to the FIG. 1 circuit with the exception that transistor $Q_1$ in FIG. 2 comprises the amplifier for a phase shift oscillator, and the signal means, rather than comprising a lamp as shown in FIG. 1, comprises a transducer 82 deriving power from a transformer 84 in the collector circuit of transistor $Q_1$. The phase shift oscillator includes a phase shift network comprising capacitors $C_1$, $C_2$, and $C_3$ and resistors $R_4$, $R_5$ and $R_6$ which function in the well-known manner to furnish the necessary 180° phase shift in the portion of the output which is fed back through lead 86 to the base electrode 28 of $Q_1$. As is well known, with the values of $C_1$, $C_2$, $C_3$, $R_4$, $R_5$ and $R_6$ properly selected to give 180° of phase shift, when transistor $Q_1$ is turned on by a proper trigger voltage at terminal 48, an oscillatory current will be driven through the primary coil of transformer 84. The transducer 82 might take the form of earphones in order that an audible signal will be produced at the signal condition.

A second modification of the control circuit illustrated in FIG. 1 is shown in FIG. 3. The control circuit described in FIG. 3 includes switching means comprising NPN transistors $Q_1'$ and $Q_2'$ connected in series with each other and with a lamp 20 constituting the signal means.

Transistor $Q_1'$ has collector, base, and emitter electrodes, 26', 28', and 30', respectively. Transistor $Q_2'$ has collector, base and emitter electrodes, 32', 34' and 36', respectively. A voltage-dividing network 42' comprises a resistor $R_1'$, a photoconductive element 44' and a second resistor $R_2'$. A source of supply voltage $E_0$ drives the transistors $Q_1'$ and $Q_2'$ and supplies current for the voltage-dividing network 42'. The control circuit of FIG. 3 comprises essentially an "AND" circuit, since transistors $Q_1'$ and $Q_2'$ must be biased into conduction before the lamp 20 will be activated.

In operation, with a proper selection of resistors $R_1'$ and $R_2'$ and a proper calibration of all components of the photometric apparatus, trigger voltages will be produced at terminals 48' and 50' only at the signal condition wherein an exposure factor value within a narrow range of appropriate values has been selected. Assuming a use of the FIG. 3 circuit with the complementary apparatus illustrated in FIG. 1, if a relative aperture value is selected which would cause an underexposure of the photosensitive materials, the disc 56 will be positioned such that the filter 60 blocks an excessive amount of light from the scene which would otherwise reach the photoconductive element 44'. The resistance of the element 44' is then greater than at the signal condition wherein the element 44' has a predetermined resistance value. In this instance, sufficient bias will be developed across the base and emitter electrodes 28', 30' of transistor $Q_1'$ to turn $Q_1'$ on; however, transistor $Q_2$ will be biased into a state of nonconduction due to insufficient forward bias across its base and emitter electrodes 34', 36'. Thus, the lamp 20 will not be activated at this condition.

At the signal condition wherein an appropriate relative aperture value has been selected, the filter 60 allows an amount of scene light to impinge on the photoconductive element 44' which causes the element 44' to have the said predetermined resistance. The resistance of the element 44' is such that trigger voltages are developed at both of terminals 48' and 50'. Thus, both of transistors $Q_1'$ and $Q_2'$ are biased into conduction, causing the lamp 20 to be activated.

If a relative aperture value is selected which would cause an overexposure of the photosensitive materials, the disc 56 will be positioned such that the filter 60 will allow an excessive amount of light to impinge upon the photoconductive element 44. The element 44' will then have a resistance less than the said predetermined resistance, causing insufficient forward bias voltage to be produced between the base and emitter electrodes 28', 30', respectively, to allow $Q_1'$ to conduct. Thus, with this circuit, as with the circuits illustrated in FIGS. 1 and 2, the signal means is activated only when an exposure factor value within a narrow range of appropriate values is selected. At other selected values, wherein the photoconductive element 44' has a resistance value deviating from the predetermined resistance value, either transistor $Q_1'$ or transistor $Q_2'$ is biased into a state of non-conduction.

Figure 4:
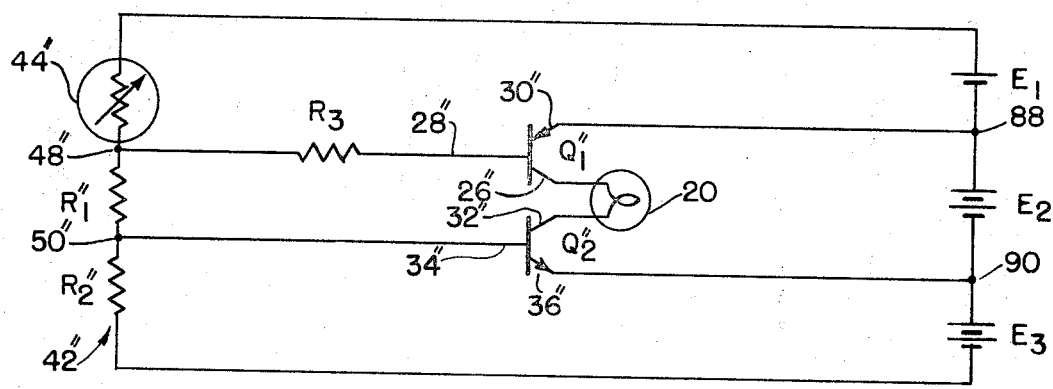
FIG. 4 illustrates an additional control circuit representing a still further embodiment of the invention.

A third modification of the control circuit 22 in FIG. 1 is shown in FIG. 4. This circuit resembles closely the FIG. 3 circuit, having switching means comprising transistors $Q_1''$ and $Q_2''$ connected in series. Transistor $Q_1''$ is a PNP transistor having emitter, base and collector electrodes 26'', 28'' and 30'', respectively. Transistor $Q_2''$ is of the NPN type and includes emitter, base and collector electrodes 32'', 34'' and 36'', respectively. The emitter electrodes 30'' and 36'' of transistors $Q_1''$ and $Q_2''$, respectively, are tapped at terminals 88, 90 of the source of supply voltage comprising sources $E_1$, $G_2$ and $E_3$. The use of battery taps enhance the adjustability and temperature stability of the circuit and decreases the sensitivity of the circuit to variations in the supply voltage. A voltage-dividing network 42'' comprises a photoconductive element 44'' and resistors $R_1''$ and $R_2''$.

Assuming a use of the FIG. 4 circuit with the complementary apparatus illustrated in FIG. 1, if a relative aperture value is selected which would cause an underexposure of the photosensitive materials, the filter 60 will be positioned such that the filter passes an amount of light to the photoconductive element 44'' effective to cause the element 44'' to have a resistance value greater than it would have at the signal condition. Transistor $Q_1''$ will then have sufficient forward bias across its base and emitter electrodes 28'', 30'', to conduct; however, insufficient voltage will be developed at terminal 50'' to trigger transistor $Q_2''$ into conduction. Hence, the lamp 20 will not be activated.

At the signal condition wherein an appropriate relative aperture value has been selected, element 44'' has said predetermined resistance value and trigger voltages are developed at terminals 48'' and 50'', causing both of transistors $Q_1'$ and $Q_2''$ to be turned on and lamp 20 to be activated. At selected relative aperture values which would cause an overexposure of the photosensitive materials, the filter 60 will pass an amount of light to the photoconductive element 44'' which is effective to cause the element 44'' to have a resistance value less than said predetermined value. At such a condition, transistor $Q_1''$ will lack sufficient forward bias to conduct and lamp 20 will be unenergized. Certain changes may be made in the above apparatus without departing from the scope of the invention herein involved. For example, a linearly movable filter or optical wedge or a diaphragm might be substituted for the illustrated disc 56 and filter 60. As an alternative to using a graded density filter as a means for varying the division of voltage on the voltage-dividing network 42, the filter 60 may be eliminated and a potentiometer inserted in the voltage-dividing network which could be varied to control the apportionment of voltage on the voltage-dividing network. Any of a number of coupling arrangements would be satisfactory. As intimated above, the means for selectively varying the division of voltage on the voltage-dividing network might also be coupled to a variable speed shutter mechanism or conjointly to the shutter mechanism and the variable diaphragm.

It is therefore intended that all matter contained in the above description or shown in the accompanying drawings shall be interpreted as illustrative and not in a limiting sense.

What is claimed is:

1. Photographic photometric apparatus providing a positive signal at a signal condition indicating the selection of an exposure factor value appropriate for the scene brightness and the photosensitive materials employed, comprising:

signal indicator means for providing a positive signal only at said signal condition;

a source of electrical energy coupled to said signal indicator means for selectively energizing said signal indicator means;

a control circuit for controlling the activation of said signal indicator means, comprising:

conductor means for applying said source of electrical energy to said signal indicator means, switching means comprising:

a first transistor for controlling the application of power from said conductor means to said signal indicator means, said first transistor having a base electrode and having emitter and collector electrodes connected in series with said signal indicator means, a second transistor for controlling the conduction of said first transistor and hence the activation of said signal indicator means, said second transistor having a base electrode and having collector and emitter electrodes connected in shunt across said base and emitter electrodes of said first transistor, a voltage-dividing network providing bias voltage for said first and second transistors, means for coupling voltages generated on said network to the base electrodes of said first and second transistors, and a photoconductive element in said network exposed to light from the scene to be photographed; and adjustable means for selectively varying the division of voltage on said network, whereby at a first setting of said adjustable means said voltage-dividing network develops a first trigger voltage effective to turn said first transistor on to activate said signal indicator means, and whereby at a second setting of said adjustable means said voltage-dividing network develops a second trigger voltage effective to turn said second transistor on, causing the base-emitter bias of said first transistor to be decreased to turn said first transistor off and deactivate said signal indicator means, the activation of said signal indicator means indicating the selection of exposure factor values approximating said appropriate value.

2. The invention defined by claim 1 wherein said adjustable means comprises variable light-attenuating means for selectively varying the scene light admitted to said photoconductive element and thus the resistance of said element.

3. The invention defined by claim 2 wherein said light-attenuating means comprises a graded density filter.

4. The invention defined by claim 3 wherein said first transistor comprises an amplifying component of an oscillator and wherein said signal means comprises transducer means for producing an audible output.

5. Photometric apparatus having at least one component for selecting various photometric value settings and providing a positive signal at a unique signal condition indicating the selection of a photometric value within a narrow range of values corresponding to the brightness of a measured field of illumination comprising:

signal indicator means for generating a perceptible signal when energized;

a source of electrical energy coupled for selectively energizing said signal indicator means;

switching means coupled in switching relationship with said signal indicator means and said source of energy for controlling the selective energization of said signal indicator means;

a photoconductive element exposed to light from said field of illumination, said photoconductive element being coupled to said switching means and having an electrical parameter varying in accordance with the intensity of light incident thereon;

adjustable means providing for the orientation of said at least one component of said apparatus for selecting various photometric value settings; and network means coupling said switching means, said adjustable means and said photoconductive element for causing said switching means to energize said signal means when the selected photometric value lies within said range of appropriate values and for causing said switching means to de-energize said signal indicator means when the selected photometric value deviates from said range of appropriate values.

6. Photometric apparatus having at least one component for selecting various photometric value settings and providing a positive signal at a unique signal condition indicating the selection of a photometric value within a narrow range of values corresponding to the brightness of a measured field of illumination comprising:

adjustable means providing for the orientation of said at least one component of said apparatus for selecting various photometric value settings;

signal indicator means for generating a positive signal when energized;

a source of electrical energy coupled to said signal indicator means for selectively energizing said signal indicator means;

switching means for controlling the selective energization of said signal indicator means and comprising:

first means coupled in series with said signal indicator means for controlling the application of power from said source of electrical energy to said signal indicator means, and second means for controlling the conduction of said first means and hence the energization of said signal indicator means;

a photoconductive element exposed to light from said field of illumination and having an electrical parameter varying in accordance with the intensity of light incident thereon; and triggering means coupled with said photoconductive element, responsive to said electrical parameter and controlled by said adjustable means for controlling said first and second means, said triggering means being effective at a first setting of said adjustable means to trigger said first means into conduction to energize said signal indicator means and being effective at a second setting of said adjustable means to cause said second means to interrupt the conduction of said first means to de-energize said signal indicator means, the energization of said signal indicator means indicating the selection of photometric values within said range of appropriate values.

7. Photometric apparatus having at least one component for selecting various photometric value settings and providing a positive signal at a unique signal condition indicating the selection of a photometric value within a narrow range of values corresponding to the brightness of a measured field of illumination comprising:

adjustable means providing for the orientation of said at least one component of said apparatus for selecting various photometric value settings;

signal indicator means for generating a positive signal when energized;

a source of electrical energy coupled for selectively energizing said signal indicator means;

switching means for controlling the selective energization of said signal indicator means and comprising:

first means coupled in series with said signal indicator means for controlling the application of power from said source of electrical energy to said signal indicator means, and second means for controlling the conduction of said first means and hence the energization of said signal indicator means;

a photoconductive element exposed to light from said field of illumination and having an electrical parameter varying in accordance with the intensity of light incident thereon; and triggering means electrically coupled with said photoconductive element, responsive to said electrical parameter and controlled by said adjustable means for controlling said first and second means, said triggering means being effective to trigger both of said first and second means into conduction to energize said signal indicator means only when the said adjustable means selection of a photometric value setting falls within said range of appropriate values.

8. The invention defined by claim 6 wherein said first means and second means of said switching means comprise, respectively, first and second transistors having respective collector-emitter circuits connected in series with each other and with said signal indicator means, said triggering means developing trigger voltages effective to turn on both of said first and second transistors only when said selected photometric value falls within said narrow range of values.

9. The invention defined by claim 5 wherein said adjustable means comprises light-attenuating means for selectively varying the scene light admitted to said photoconductive element and thus the resistance of said element.

10. The invention defined by claim 5 wherein said switching means comprises first and second transistors having respective collector-emitter circuits connected in series with each other and with said signal indicator means, said network means developing trigger voltages effective to turn on both of said first and second transistors only when said selected photometric value falls within said narrow range of values.

11. The invention defined by claim 5 wherein said switching means comprises:
- a first transistor in series with said signal indicator means, said first transistor having base and emitter electrodes, and
- a second transistor having collector and emitter electrodes connected in shunt with said base and emitter electrodes of said first transistor, whereby at a first setting of said adjustable means said network means is effective to turn said first transistor on to activate said signal indicator means, and whereby at a second setting of said adjustable means said network means is effective to turn said second transistor on, causing the base-emitter bias of said first transistor to be decreased to turn said first transistor off and deactivate said signal indicator means.

12. The invention defined by claim 11 wherein said first transistor comprises an amplifying component of an oscillator and wherein said signal indicator means comprises transducer means for producing an audible output.

13. The invention defined by claim 9 wherein said light-attenuating means comprises a graded density filter.

References Cited

UNITED STATES PATENTS

| | | | |
|---|---|---|---|
| 2,149,250 | 3/1939 | Bing | 88—23G |
| 2,453,693 | 11/1948 | Armstrong et al. | 95—64D |
| 2,750,453 | 6/1956 | Pritchard | 95—10CUX |
| 3,019,700 | 2/1962 | Colmar | 88—23G |
| 3,049,964 | 8/1962 | Miller et al. | 88—23G |
| 3,155,952 | 11/1964 | Boehm et al. | 340—244B |
| 3,321,754 | 5/1967 | Grimm et al. | 307—318X |
| 3,323,430 | 6/1967 | Cooper, Jr. | 88—23G |
| 3,337,778 | 8/1967 | Becker | 340—228X |

RONALD L. WIBERT, Primary Examiner

A. SKLAR, Assistant Examiner

U.S. Cl. X.R.

95—10; 250—206, 214; 340—227; 356—227